United States Patent
Altman et al.

(10) Patent No.: US 10,235,526 B2
(45) Date of Patent: Mar. 19, 2019

(54) SECURE RESUME FROM A LOW POWER STATE

(71) Applicant: INTEL CORPORATION, Santa Clara, CA (US)

(72) Inventors: Asher Altman, Bedford, MA (US); Mark Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 87 days.

(21) Appl. No.: 14/975,569

(22) Filed: Dec. 18, 2015

(65) Prior Publication Data

US 2017/0177381 A1    Jun. 22, 2017

(51) Int. Cl.

| | |
|---|---|
| *G06F 21/57* | (2013.01) |
| *G06F 9/4401* | (2018.01) |
| *G06F 21/60* | (2013.01) |
| *G06F 21/62* | (2013.01) |
| *H04L 29/06* | (2006.01) |
| *G06F 21/44* | (2013.01) |
| *G06F 21/78* | (2013.01) |
| *G06F 21/81* | (2013.01) |

(52) U.S. Cl.
CPC .......... *G06F 21/575* (2013.01); *G06F 9/4416* (2013.01); *G06F 21/44* (2013.01); *G06F 21/602* (2013.01); *G06F 21/62* (2013.01); *G06F 21/78* (2013.01); *G06F 21/81* (2013.01); *H04L 63/0428* (2013.01)

(58) Field of Classification Search
CPC ...... G06F 21/575; G06F 21/602; G06F 21/62; H04L 63/0428

See application file for complete search history.

(56) References Cited

U.S. PATENT DOCUMENTS

| | | |
|---|---|---|
| 2012/0239939 A1 | 9/2012 | Seethaler et al. |
| 2012/0254602 A1 | 10/2012 | Bhansali et al. |
| 2014/0006799 A1* | 1/2014 | Zmudzinski ........ G06F 12/1408 713/189 |
| 2014/0325681 A1 | 10/2014 | Kleidermacher et al. |
| 2015/0013002 A1 | 1/2015 | Smith et al. |
| 2015/0242332 A1 | 8/2015 | Kamath et al. |
| 2015/0381634 A1* | 12/2015 | Lal .................... H04L 63/12 713/168 |

OTHER PUBLICATIONS

International Search Report and Written opinion received for PCT Patent Application No. PCT/US2016/062951, dated Mar. 6, 2017, 8 pages.

* cited by examiner

*Primary Examiner* — Dao Q Ho

(57) ABSTRACT

Various embodiments are directed to a system for accessing a self-encrypting drive (SED) upon resuming from a sleep power mode (SPM) state. An SED may be authenticated within a system, for example, upon resuming from a sleep state, based on unwrapping the SED passphrase with a SPM resume passphrase stored in a standby power register to receive power during the SPM state.

19 Claims, 10 Drawing Sheets

SECURE RESUME FROM A LOW POWER STATE

TECHNICAL FIELD

Embodiments described herein generally relate to secure computing systems, and particularly, to authenticating self-encrypting storage volumes upon resuming from a low power state.

BACKGROUND

Modern storage volumes, such as, for example, solid state drives, conventional disk drives, or the like, may include the ability to "self-encrypt." In general, a self-encrypting drive (SED) is a storage volume (or drive) that encrypts and decrypts data on the volume. In particular, SEDs typically encrypt all the data (all the user data, or the like) on the drive. As such, when the drive is powered on, access credentials are used to "unlock" or decrypt the data. More particularly, during operation, the data is decrypted on the fly. Accordingly, when the drive is powered off, the data remains "locked" or encrypted so that unauthorized access to the data can be minimized In general, SEDs include circuitry to receive access credentials, decrypt the contents of the drive using the access credentials, and encrypt the contents of the drive upon shut down.

Many modern computing devices include a number of low power states. For example, sleep, hibernate, or the like. With some low power states, for example, sleep (or S3) large portions of the system are powered off while other portions (e.g., DRAM, or the like) are placed in a self-refresh mode such that waking or resuming activity from the low power state is faster. In such states, the SED is typically powered off. As such, the contents of the SED are encrypted and upon waking, a user must reenter their credentials to access the drive.

With some computing systems, to maintain the user experience and functionality, the access credentials for the SED are cached (e.g., in the self-refreshing DRAM, or the like) so that they can be reused upon resuming activity from a sleep state. However, it is noted, that this may provide security vulnerabilities as the access credentials can be captured when the credentials are reused. For example, the security credentials may be captured by a protocol analyzer, execution of malware, or even by moving the DRAM to another system to recover the access credentials.

It is with respect to these and other considerations that the embodiments described herein are needed.

DETAILED DESCRIPTION

Figure 1:
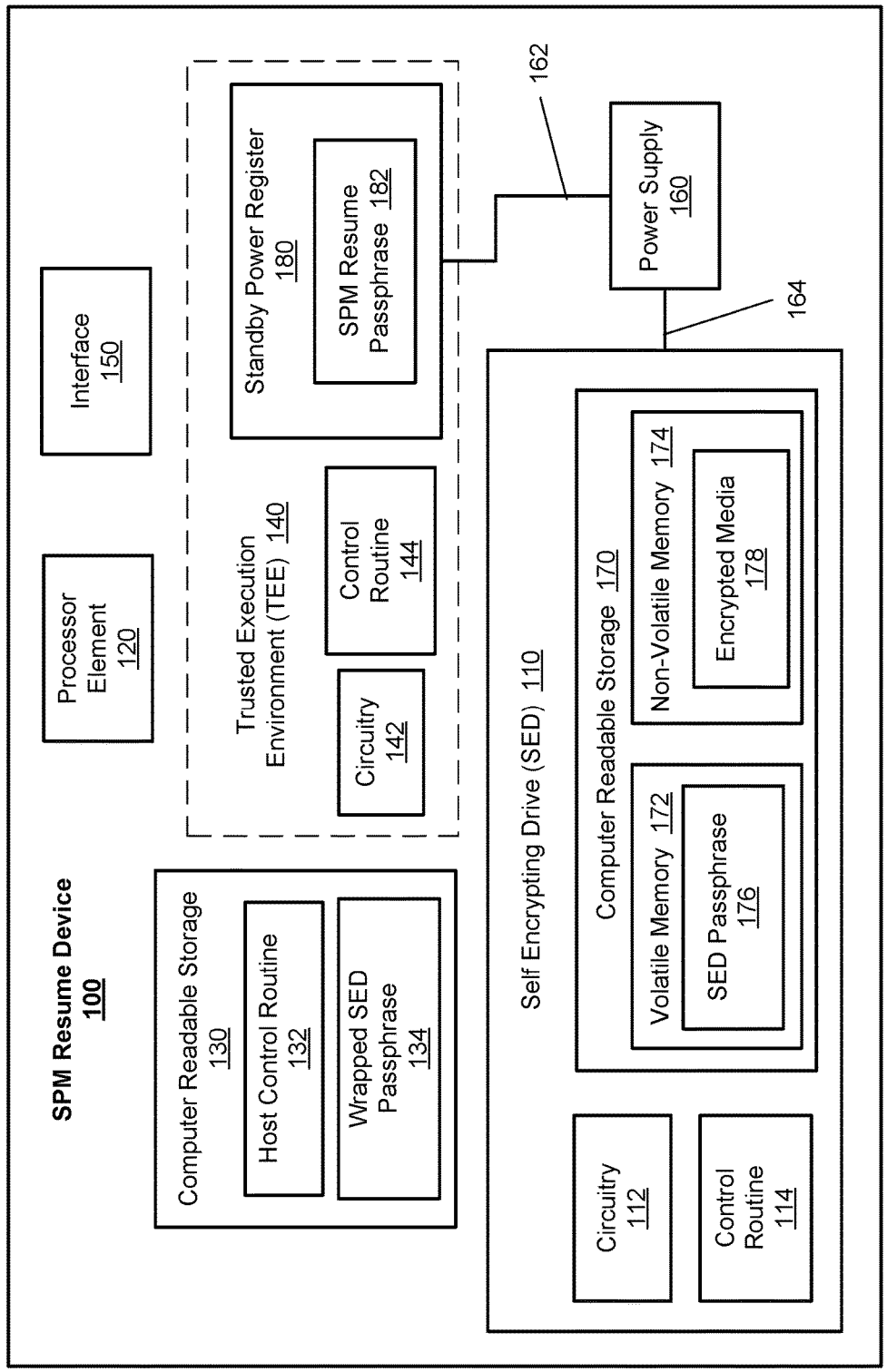
FIG. 1 illustrates a block diagram of a first example device according to an embodiment.

Various embodiments are directed to a system for accessing a self-encrypting drive (SED) upon resuming from a low power state, in which the SED may be powered off. In general, the present disclosure provides that a secure portion of a system including an SED configured to maintain power during a low power state while the SED is powered off. This portion of the system stores the authentication credentials to unlock the SED upon exiting the low power state. However, if the entire system loses power, then the authentication credentials can be destroyed. As such, the SED may be unlocked upon exiting a low power state. However, the authentication credentials need not be stored in an unsecured manner. More specifically, the authentication credentials may be stored within a secure boundary, such as, for example, within the SED itself, within a trusted execution environment (TEE), or the like.

The present disclosure may be implemented to access or unlock an SED upon resuming from a sleep power mode (e.g., S3 power state mode, or the like). For example, upon initialization of the SED, the access credentials may be provided to unlock the SED. These access credentials may be wrapped with a sleep power mode (SPM) resume passphrase and then stored in persistent storage. The SPM resume passphrase may be stored in a portion of secure memory (e.g., within the SED, within a TEE, or the like) where power is maintained during a SPM state. As such, upon resuming from the SPM state, the SPM resume passphrase may be provided to unwrap the access credentials and again decrypt the contents of the SED. However, if the system loses power before resuming from the SPM state, then the SPM resume passphrase may be erased. For example, the SPM resume passphrase may be passively or actively erased.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 2:
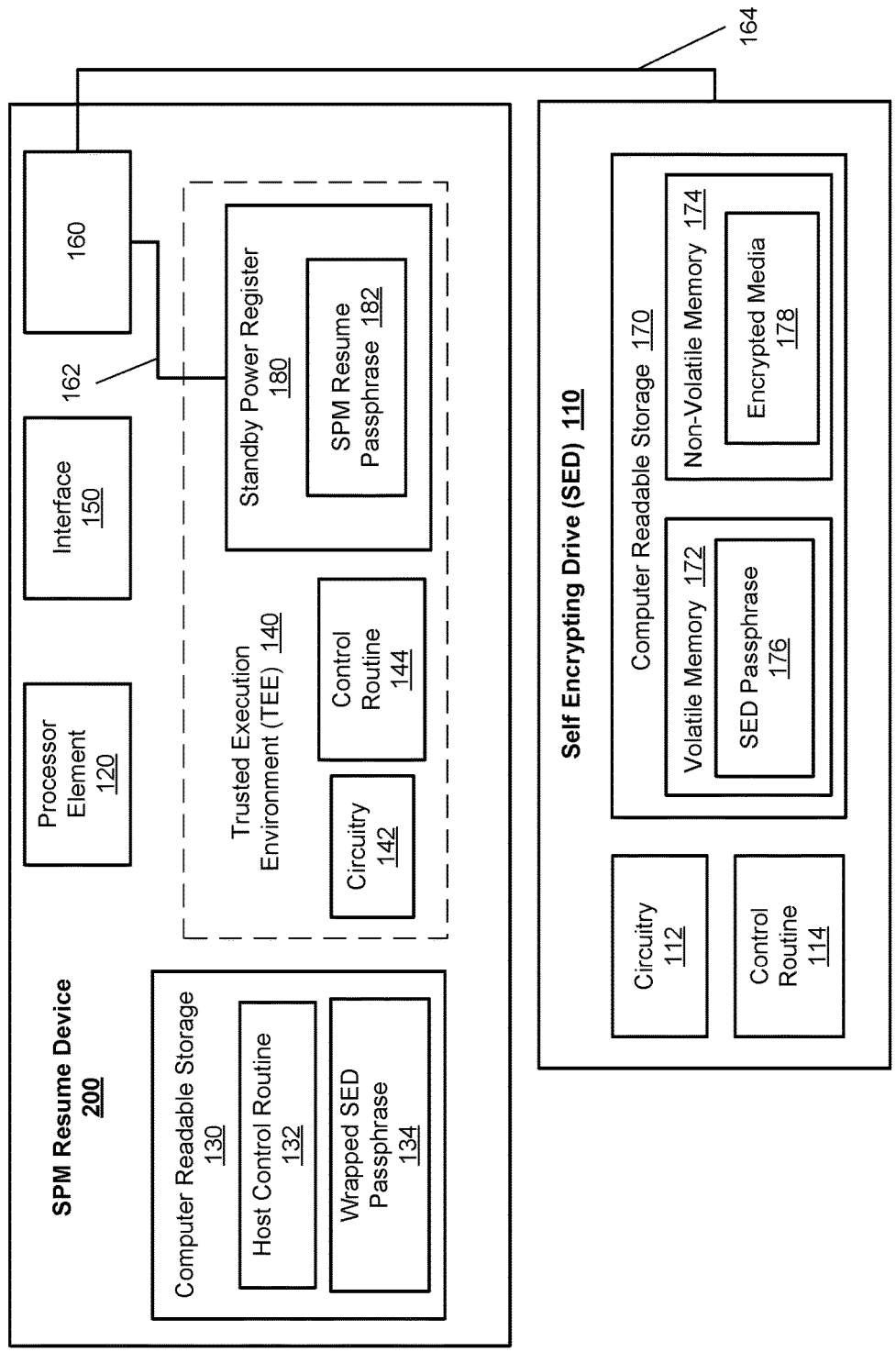
FIG. 2 illustrates a block diagram of a second example device according to an embodiment.
Figure 3:
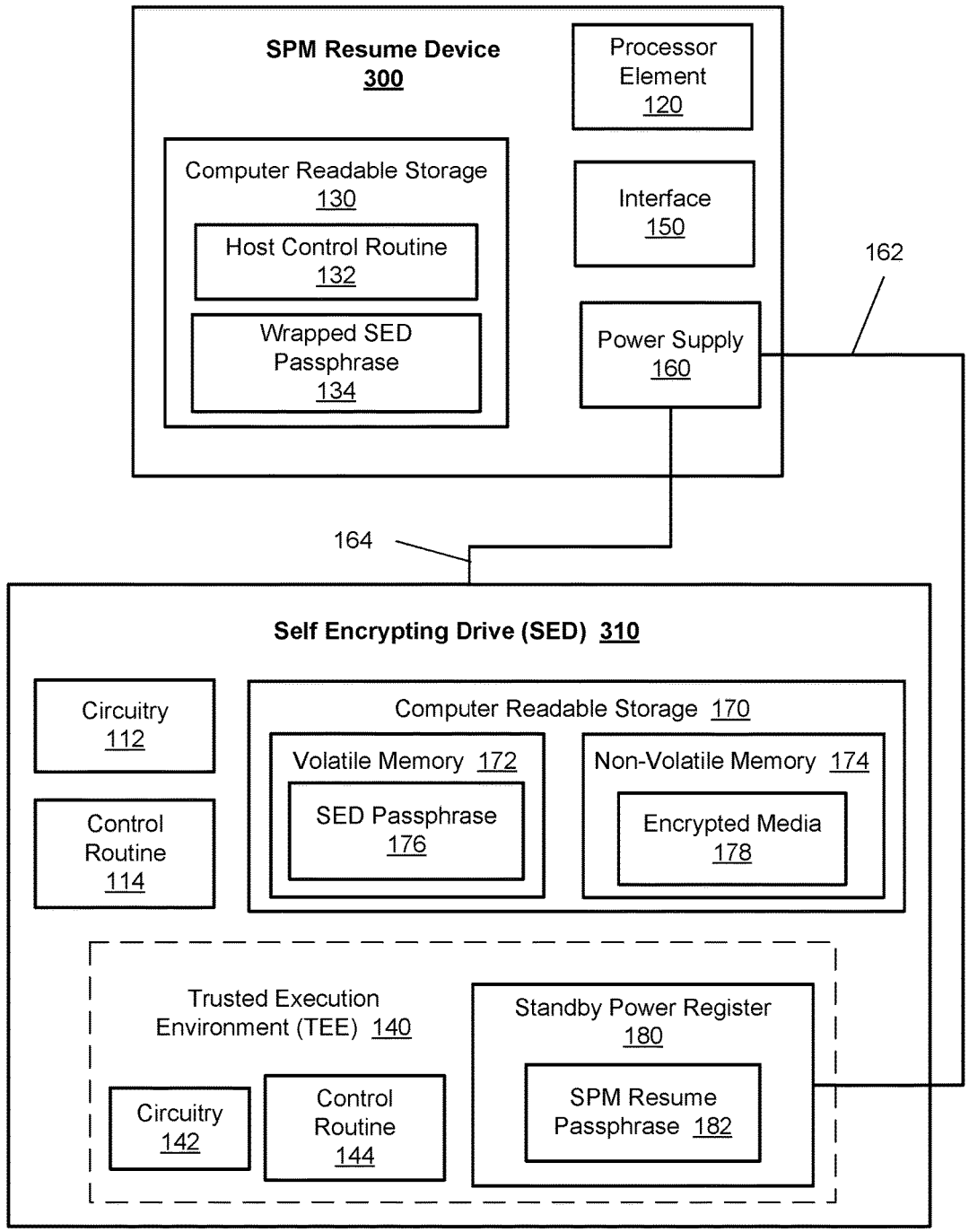
FIG. 3 illustrates a block diagram of a third example device according to an embodiment.

FIGS. 1-3 depict block diagrams of example devices for providing SED access credentials, upon resuming from an SPM state. In particular, these figures depict examples of devices to authenticate the SED upon resuming from an SPM state. Said differently, the devices may provide access credentials to unlock and/or decrypt the contents of the SED upon resuming from an SPM state.

Referring particularly to FIG. 1, an SPM resume device 100 is depicted. The device 100 incorporates an SED 110 and one or more of a processor element 120, a computer-readable storage 130, a trusted execution environment (TEE) 140, an interface 150, and a power supply 160. The SED 110 includes one or more of a control routine 114, circuitry 112, and computer-readable storage 170. The TEE 140 includes one or more of a control routine 144, circuitry 142, and a standby power register 180.

Referring particularly to FIG. 2, an SPM resume device 200 is depicted. Unlike the device 100, the device 200 does not include the SED 110. In particular, as depicted, the device 200 is coupled to the SED 110. The device 200 incorporates one or more of a processor element 120, a computer-readable storage 130, a trusted execution environment (TEE) 140, an interface 150, and a power supply 160. The SED 110 includes one or more of a control routine 114, circuitry 112, and computer-readable storage 170. The TEE 140 includes one or more of a control routine 144, circuitry 142, and a standby power register 180.

Referring particularly to FIG. 3, an SPM resume device 300 is depicted. The device 300 can be coupled to an SED 310. The device 300 incorporates one or more of a processor element 120, a computer-readable storage 130, an interface 150, and a power supply 160; while the SED 310 includes one or more of a control routine 114, circuitry 112, a trusted execution environment (TEE) 140, and computer-readable storage 170. The TEE 140 includes one or more of a control routine 144, circuitry 142, and a standby power register 180.

Referring to FIGS. 1-3 collectively, the computer-readable storage 130 stores one or more of a host control routine 132 and a wrapped SED passphrase 134. The computer-readable storage 170 includes one or more of a volatile computer-readable storage 172 and a non-volatile computer-readable storage 174. The volatile computer-readable storage 172 includes at least an SED passphrase 176 while the non-volatile computer-readable storage 174 includes at least encrypted media 172. The standby power register 180 stores at least an SPM resume passphrase 182.

In general, the power supply 160 may be configured to supply power the components of the device 100 (or 200, or 300, respectively). The power supply 160 may at least supply power the SED 110 (or 310, respectively) and the standby power register 180. During operation, that is when the device 100 (or 200, or 300, respectively) is not in a SPM state (e.g., S3, or the like) the power supply 160 supplies current to the SED 110 (or 310, respectively) and the standby power register 180. For example, the power supply 160 may be electrically coupled to the standby power register 180 via a first power rail 162. The power supply 160 may be electrically coupled to the SED 110 (or 310, respectively) via a second power rail 164. During normal operation, the power supply 160 may supply current over both power rails 162 and 164. However, during an SPM state, where the SED 110 is "sleeping," the power supply 160 may only supply current over the power rail 162. More specifically, the SED 110 (or 310, respectively) may be powered off during the SPM state while the standby power register 180 is powered on. However, in the event that all power to the device 100 (or 200, or 300, respectively) is lost (e.g., powered down, unintentional power interruption, complete battery drain, or the like) the power supply 160 will not supply power to either the SED 110 (or 310, respectively) or the standby power register 180.

In general, the host control routine 132 incorporates a sequence of instructions operative on the components of the device 100 (or 200, or 300, respectively), such as, for example, the processor element 120 to implement logic to unlock the SED 110 (or 310, respectively). In executing the host control routine 132, the processor element 120 may initiate unlocking of the SED 110 (or 310, respectively). In general, the control routines 112 and 142 may incorporate a sequence of instructions operative on the circuitry 112 and 142, respectively, to implement logic to unlock the SED 110 (or 310, respectively). For example, the processor element 120 may execute the host control routine 132 to unlock (e.g., access the encrypted media 178, or the like) the SED 110 (or 310, respectively). As another example, the circuitry 112 may execute the control routine 114 to unlock (e.g., access the encrypted media 178, or the like) the SED 110 (or 310, respectively). As another example, the circuitry 142 may execute the control routine 144 to unlock (e.g., access the encrypted media 178, or the like) the SED 110 (or 310, respectively). In particular, the control routines may unlock the SED 110 (or 310, respectively) from an SPM state, for example, where the SED 110 (or 310, respectively) is in a sleep (e.g., S3, or the like) state.

In executing the host control routine 132, the processor element 120 requests access credentials from a user, for example, upon startup from a cold-boot, or the like. For example, the host control routine 132 may request the SED passphrase 176 from a user. The host control routine 132 may receive the SED passphrase 176 and send (e.g., send an information element to include an indication of the SED passphrase 176, or the like) to the SED 110 (or 310, respectively).

Upon resuming from a SPM state (e.g., a sleep state, S3, or the like), the processor element 120, in executing the host control routine 132 may request the SED 110 (or 310, respectively) to unlock based on the SPM state resume technique (e.g., refer to FIGS. 5-6) described herein. In particular, the device 100 (or 200, or 300, respectively) may be configured to implement various low power states, where portions of the device platform are powered off. As a specific example, the device 100 (or 200, or 300, respectively) may be configured to implement a sleep state (e.g., S3) where the SED 110 (or 310, respectively) is powered off. However, as the SED 110 (or 310, respectively) is powered off, the encrypted media 172 may be inaccessible until it is decrypted and/or unlocked, described in greater detail below.

In executing the control routine 114, the circuitry 112 may receive the SED passphrase 176 from the host control routine. The circuitry 112 may store the SED passphrase 176 to the volatile memory 172 to decrypt the encrypted media 178 (e.g., on the fly, or the like) during operation of the device 100 (or 200, or 300, respectively). More specifically, while powered on, the SED 110 (or 310, respectively) may maintain the SED passphrase 176 in volatile memory 172. However, when the device 100 (or 200, or 300, respectively) enters an SPM state the SED will be powered off (e.g., power rail 164 will not supply current to the SED 110 (or 310, respectively), or the like). As such, the SED passphrase 176 may be passively erased and the SED 110 (or 310, respectively) locked until the passphrase is restored. For example, the SED 110 (or 310, respectively) may remain locked until it is unlocked, for example, from a cold-boot as described above. Alternatively, examples of the present disclosure may be implemented to unlock the SED 110 (or 310, respectively) upon resuming from an SPM state (e.g., refer to FIGS. 5-6).

In executing the control routine 144, the circuitry 142 may receive the SED passphrase 176. For example, the circuitry 142 may receive the SED passphrase 176 from the host control routine 132 when the device 100 (or 200, or 300, respectively) is initiated from a cold-boot. In executing the control routine 144, the circuitry 142 may generate the SPM resume passphrase 182 and store the SPM resume passphrase 182 to the standby power register 180.

In executing the control routine 144, the circuitry 142 may wrap the SED passphrase 176 based on the SPM resume passphrase 182. For example, the circuitry 142 may apply an advanced encryption standard (AES) key wrap to the SED passphrase 176 based on the SPM resume passphrase 182. It is noted, that embodiments may be implemented to wrap the SED passphrase 176 using any of a variety of key wraps and the AES key wrap is given as an example only and not to be limiting.

In executing the control routine 144, the circuitry 142 may store the wrapped SED passphrase 134 to a persistent storage location, such as, for example, the computer-readable medium 130, or the like.

In executing the control routine 144, the circuitry 142 may receive an indication to unlock the SED 110 (or 310, respectively) upon resuming from an SPM state. Upon receiving the indication, the circuitry 142 may request the wrapped SED passphrase 134 from the computer-readable medium 130. In executing the control routine 144, the circuitry 142 may unwrap the wrapped SED passphrase 134 based on the SPM resume passphrase 182 to recover the SED passphrase 176. Said differently, when the device 100 resumes from an SPM state (e.g., S3, or the like) the SED 110 (or 310, respectively) may be resuming from a powered off state, and thus the SED passphrase erased. However, the SPM resume passphrase may be intact as the standby power register 180 received power during the SPM state. Accordingly, the circuitry 142 may recover the SED passphrase as described herein.

The device 100, 200, and/or 300 may be any of a variety of types of computing devices, including without limitation, a server, a desktop computer, a workstation computer, a laptop computer, a netbook computer, an ultrabook computer, a tablet computer, a handheld personal data assistant, a smartphone, a body-worn computing device (e.g., incorporated into clothing,) a media streaming device, an audio computing device, a video computing device, a smart television, or the like. It is important to note, that the components of the device 100 may be implemented within the same housing and/or within separate housings.

In various embodiments, the SED 110 and/or 310, may include any of a wide variety of hardware based disk encryption systems. For example, the SED 110 and/or 310 may be a hard disk drive, including without limitation, a hard disk drive implemented according to the OPAL and/or Enterprise standards promulgated by the Trusted Computing Group (TCG). For example, the SED 110 and/or 310 may be a hard drive implemented according to the OPAL Security Subsystem Class (SCC) 2.0 Specification, published by the TCG in 2012. With some examples, the SED 110 and/or 310 may be an enclosed hard disk drive implementing full-disk encryption, may be implemented using bridge and chipset full-disk encryption, or the like. Examples are not limited in this context.

In various embodiments, the processor element 120 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments the processor element 120 may include a trusted execution environment (e.g., Intel CSE®, Intel ME®, Intel VT®, Intel SGX®, ARM TrustedZone®, or the like) to provide for the processing and/or storing of sensitive information. As a specific example, the processor element 120 may comprise the TEE 140. In various embodiments, the circuitry 112 and/or 142 may include hardware, such as, for example, logic circuits, programmable logic, processing logic, or the like.

In various embodiments, the storage 130 and/or 170 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EE- PROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the TEE 140 may comprise logic, functions, features, and/or storage to securely implement the functions described herein. It is important to note, as stated above, the TEE 140 may be incorporated into the processor element 120. However, for purposes of clarity, the TEE 140 is depicted separate from the processor element 120. In some examples, the TEE 140 may be implemented as a secure enclave, a secure co-processor, or the like.

Figure 9:
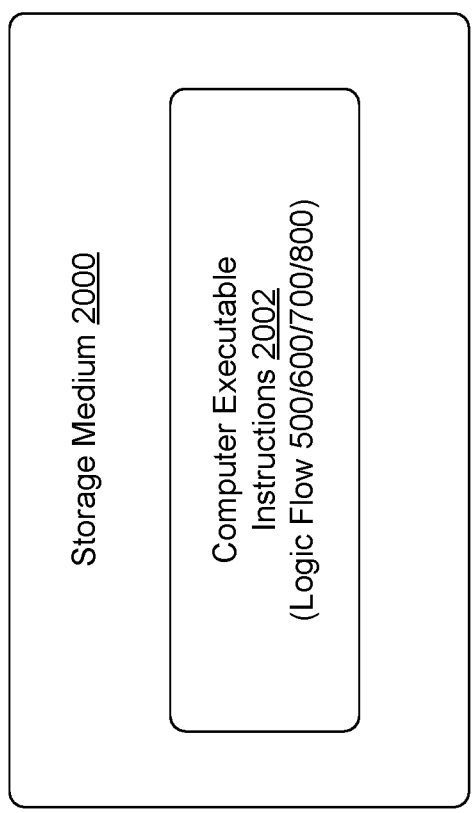
FIG. 9 illustrates an example computer-readable storage medium.

In various embodiments, the interface 150 may employ any of a wide variety of signaling technologies enabling the components to be coupled through a network (e.g., refer to FIG. 9). In particular, the device 100 may exchange signals (e.g., with another device, or the like) conveying information and/or data associated with decrypting the encrypted media 162.

In various embodiments, the power supply 160 may be any of a variety of power supplies. Additionally, the power supply 160 may include a power source or may be configured to be coupled to a power source during operation of the device 100. In various embodiments, the standby power register 180 may be a volatile computer-readable medium, or memory storage location, for example, a logical register, volatile RAM, or the like.

Figure 4:
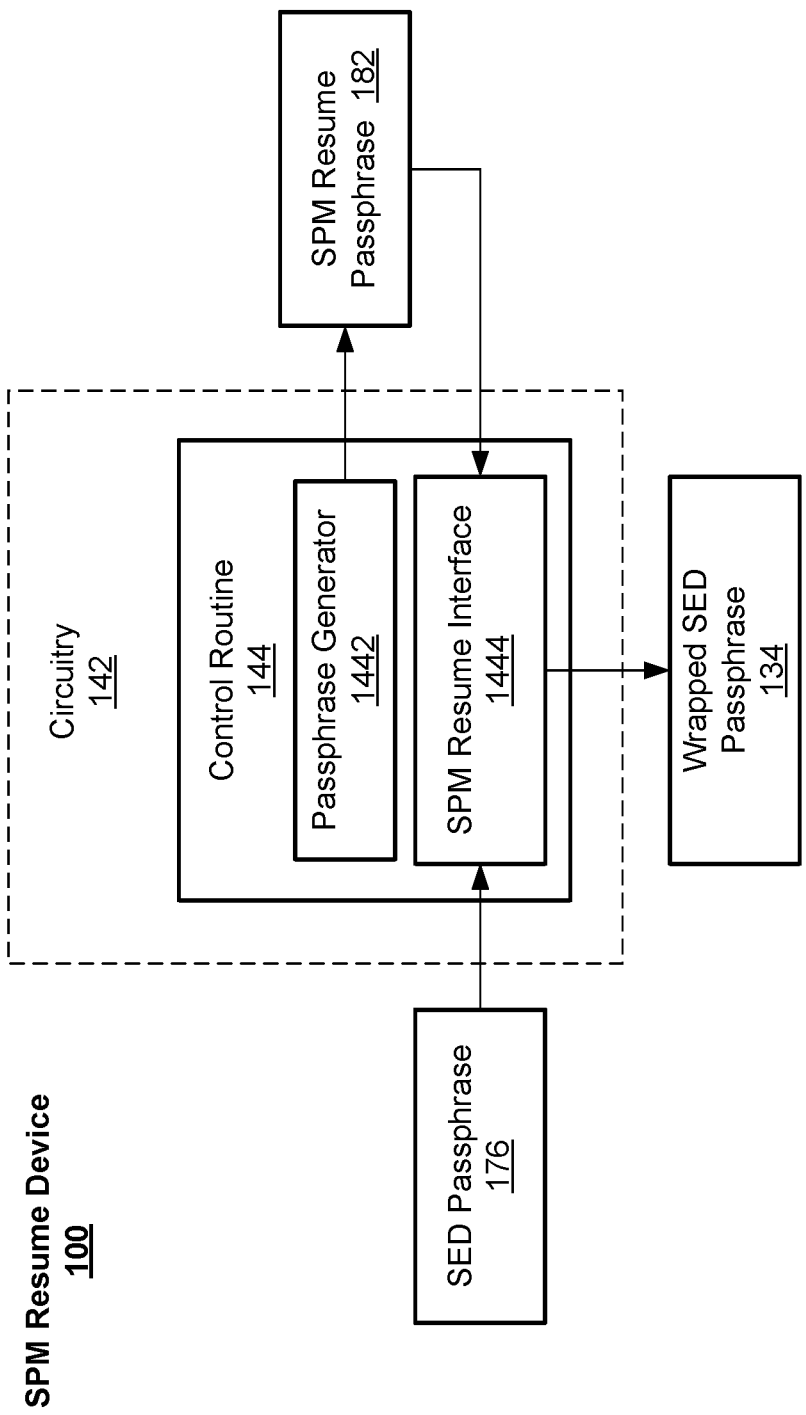
FIG. 4 illustrates a block diagram of a portion of the first example device in greater detail.

FIG. 4 depicts a block diagram of a portion of the example implementations depicted in FIGS. 1-3 in greater detail. In particular, this figure illustrates a block diagram of the control routine 144 in greater detail. Although the example depicted in FIG. 4 can be implemented with any of a variety of embodiments, the example is described with reference to the device 100 of FIG. 1. Embodiments are not limited in this context.

Turning more particularly to FIG. 4, example aspects of operation of the device 100 are depicted. In various embodiments, the control routine 144 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the corresponding circuitry 112. Where one or more device drivers are included, those device drivers may provide support for any of a variety of other components, whether hardware or software components, of the device 100.

In general, the control routine 144 is configured to generate the SPM resume passphrase 182, wrap the SED passphrase 176 with the SPM resume passphrase 182 and also to unwrap the SED passphrase 176 from the wrapped SED passphrase 134 and the SPM resume passphrase 182. The control routine 144 may comprise an SPM resume passphrase generator 1442 and an SPM resume interface 1444.

With some examples, the SPM resume passphrase generator 1442 generates the SPM resume passphrase 182. In some examples, the SPM resume passphrase generator 1442 may be a random number generator. In some examples, the SPM resume passphrase generator 1442 may be a random string generator. For example, upon initialization of the device 100 (e.g., cold-boot, or the like), the generator 1442 may generate the SPM resume passphrase 182.

The SPM resume interface 1444 receives the SED passphrase 176 and the SPM resume passphrase 182 and wraps the SED passphrase 176 based on the SPM resume passphrase to generate the wrapped SED passphrase 134. For example, upon initialization of the device 100 (e.g., cold-boot, or the like), the interface 1444 may wrap the SED passphrase 176 based on the SPM resume passphrase 182. Additionally, the interface 1444 may store the wrapped SED passphrase 134 into a persistent memory location (e.g., the storage 130, or the like).

Upon resuming from SPM state, the interface 1444 may retrieve the wrapped SED passphrase 134 and the SPM resume passphrase 182. Additionally, the interface 1444 may recover the SED passphrase 176 by unwrapping the wrapped SED passphrase 134 with the SPM resume passphrase 182.

Figure 5:
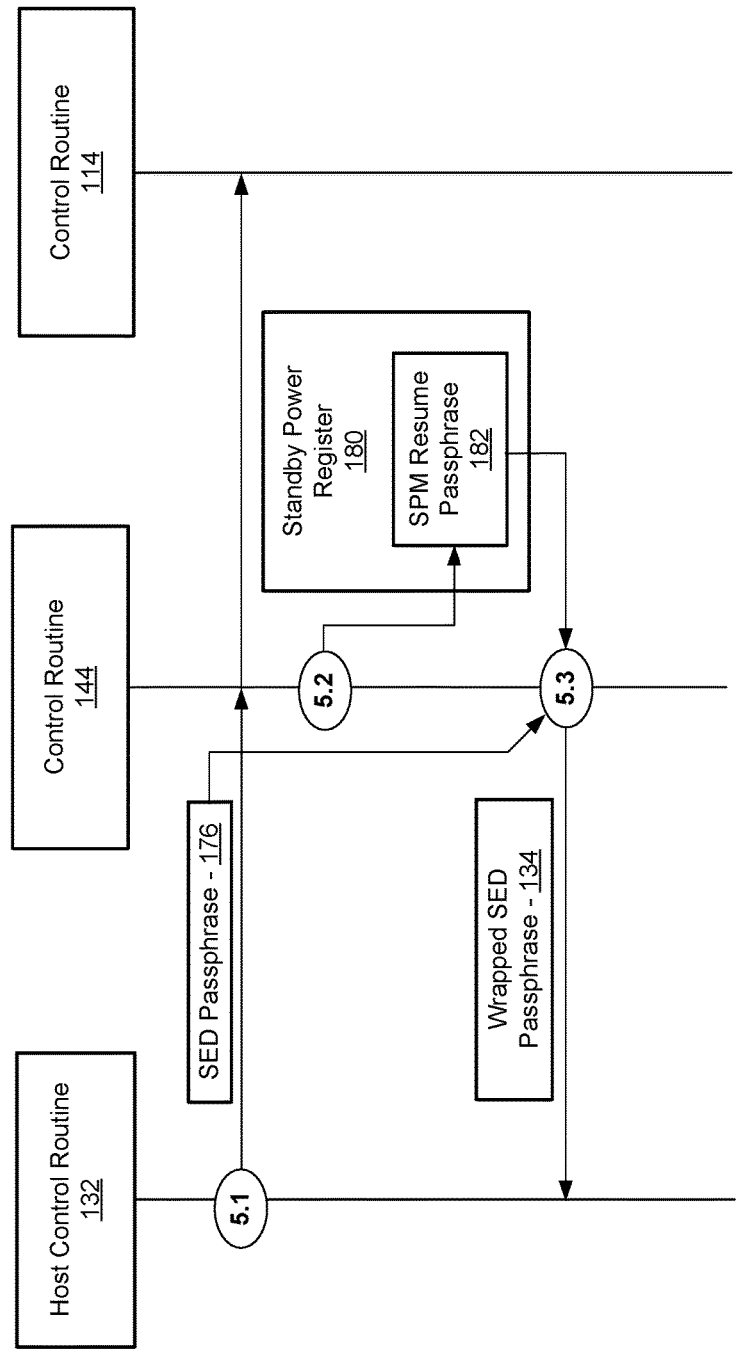
FIG. 5 illustrates a block diagram of first example technique.
Figure 6:
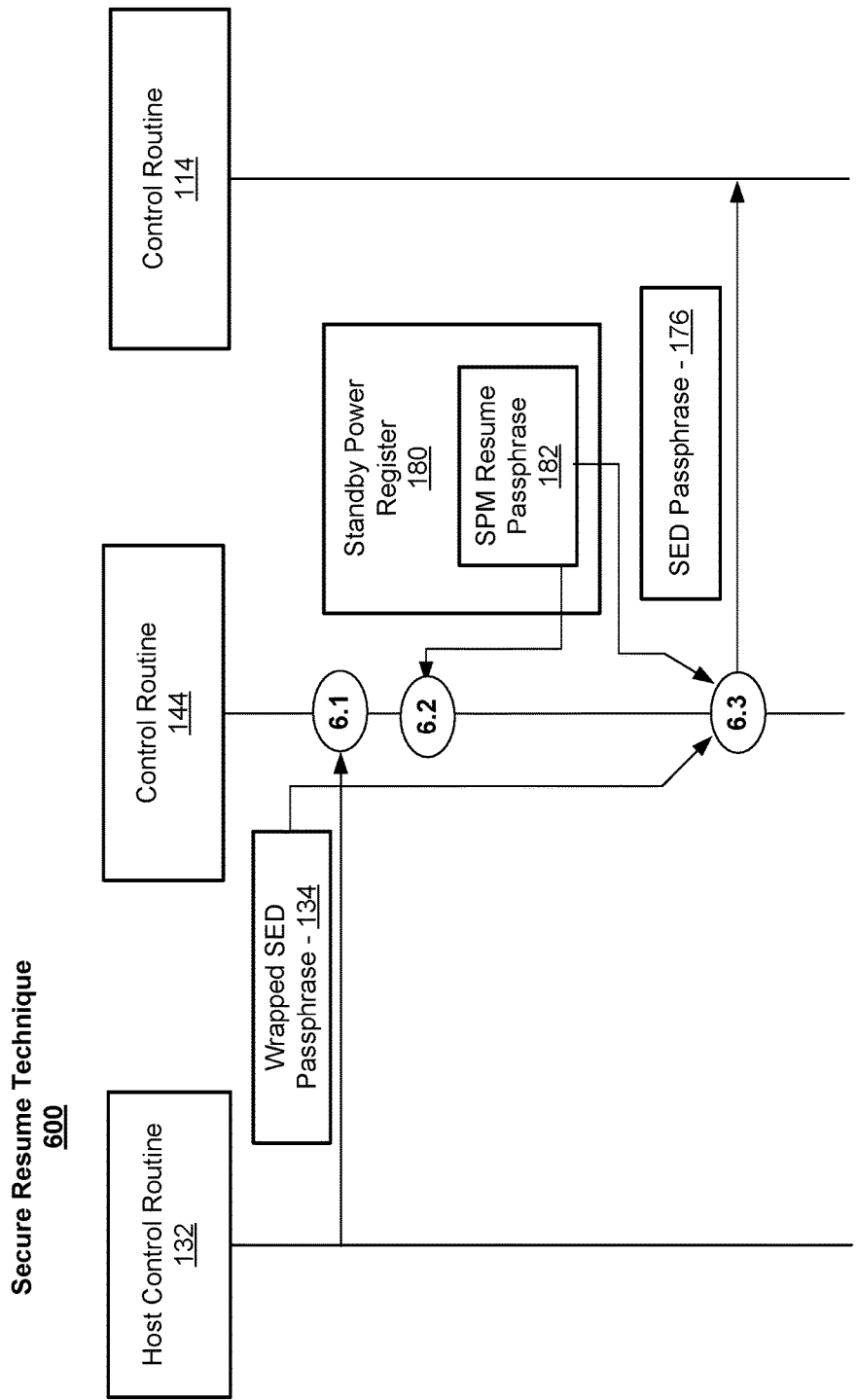
FIG. 6 illustrates a block diagram of second example technique.

FIGS. 5-6 depict techniques 500 and 600, respectively. Each of the techniques may be implemented by various embodiments according to the present disclosure. However, the techniques 500 and 600 are described with reference to the device 100 of FIG. 1. Embodiments are not limited in this context. In general, FIG. 5 and the technique 500 depict aspects of the operation of the device 100 upon initialization, such as, for example upon initialization from a cold boot while FIG. 6 and the technique 600 depict aspects of the operation of the device 100 upon resuming from an SPM state.

Turning more specifically to FIG. 5, the technique 500 may begin at block 5.1. At block 5.1, the circuitry 112 and 142, in executing the control routines 112 and 142, respectively, may receive the SED passphrase 176. For example, upon initialization from a cold boot, the device 100, and particularly, the processor 120 in executing the host control routine 132 may request the SED passphrase 176 from a user. The processor 120, in executing the host control routine 132, may receive the SED passphrase 176 and provide the SED passphrase 176 to the SED 110 to unlock the SED 110 and allow the device 100 to boot (e.g., load an operating system, access the encrypted media 178, or the like). Additionally, the processor 120, in executing the host control routine 132, may provide the SED passphrase to the TEE 144 to provide for resuming from an SPM state described herein. Accordingly, at block 5.1, the TEE 140 and the SED 110 may receive the SED passphrase 176.

Continuing to block 5.2, the TEE 140 may generate the SPM resume passphrase 182 and store the SPM resume passphrase 182 in the standby power register 180. For example, the circuitry 142, in executing the control routine 144, may generate the SPM resume passphrase 182 and store the SPM resume passphrase 182 to the standby power register 180. With some examples, the circuitry 142, in executing the control routine 144 may generate a series of random characters (e.g., a number, a random string, a set of random characters comprising numbers, letters, and/or other characters, or the like) as the SPM resume passphrase 182.

Continuing to block 5.3, the TEE 140 may wrap the SED passphrase 176 based on the SPM resume passphrase 182 to generate the wrapped SED passphrase 134. Additionally, the TEE 140 may store the wrapped SED passphrase 134 to a persistent memory location, such as, for example, the storage 130. For example, as block 5.3, the circuitry 142 in executing the control routine 144 may apply a key wrapping technique (e.g., AES key wrap, or the like) to generate the wrapped SED passphrase 134 based on the SED passphrase 176 and the SPM resume passphrase 182.

As detailed above, the device 100 may enter a low power state, or SPM state (e.g., S3, or the like) where the SED 110 is powered off. As such, the SED passphrase 176 used to access the encrypted data 178 may be passively erased as power to the SED 110 is turned off. However, as noted, the standby power register 180 receives power during the SPM state (e.g., via the power rail 162, or the like). Accordingly, the SPM resume passphrase 182 may be preserved in the SPM state.

Turning more specifically to FIG. 6, the technique 600 may begin at block 6.1. At block 6.1, the processor 120, in executing the host control routine 132 may send a control signal to the TEE 140 to resume from the SPM state (e.g., resume from S3, or the like). For example, the processor 120 in executing the host control routine 132 may send an information element to include an indication of the wrapped SED passphrase 134 to the TEE 140. As another example, at block 6.2, the TEE 140 may request and/or access the wrapped SED passphrase 134 from the storage 130.

Continuing to block 6.2, the TEE 140 may recover the SPM resume passphrase 182 from the standby power register 180. It is noted, that upon resuming from the SPM state, the contents (e.g., the SPM resume passphrase 182, or the like) of the standby power register will be preserved. However, in the event that the device 100 did not resume from the SPM state (e.g., power to the device 100 was lost before resuming initiating the technique 600, or the like), the contents of the standby power register 180 will have been passively erased (e.g., as power to the standby power register 180 would have been interrupted). Accordingly, the technique 600 may abort and the device 100 may initialize, for example, according to the technique 500.

Continuing to block 6.3, the TEE 140 may recover the SED passphrase 176 from the wrapped SED passphrase 132 and the SPM resume passphrase 182. For example, the circuitry 142 in executing the control routine 144 may apply a key wrapping technique (e.g., AES key wrap, or the like) to recover the SED passphrase 176 from the wrapped SED passphrase 134 and the SPM resume passphrase 182. Upon recovering the SED passphrase 176, the circuitry 142, in executing the control routine 144, may send an information element to include an indication of the SED passphrase 176 to the SED 110 to enable the SED 110 to decrypt the encrypted contents 178 and the device 100 to resume operation from the SPM state.

Figure 7:
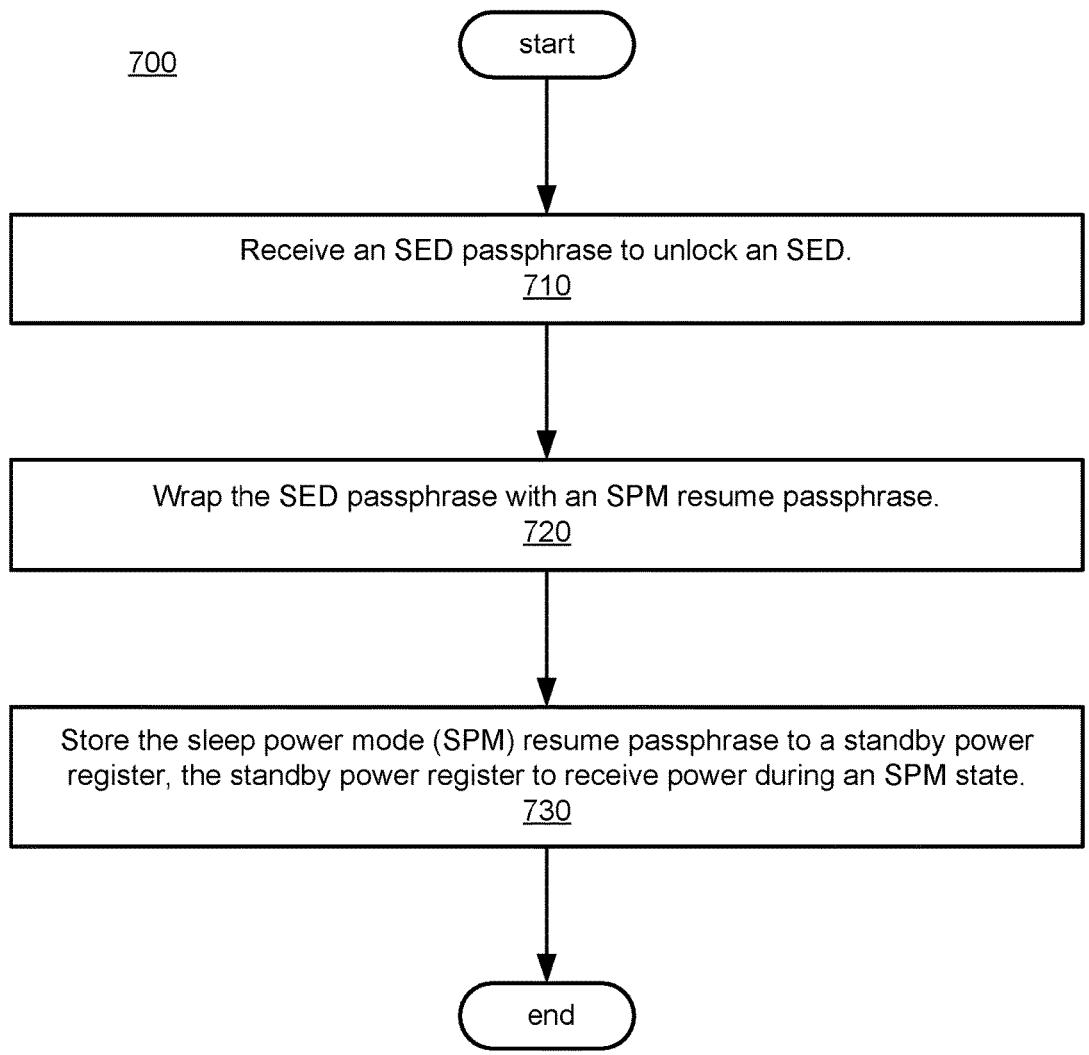
FIG. 7 illustrates a first example logic flow.
Figure 8:
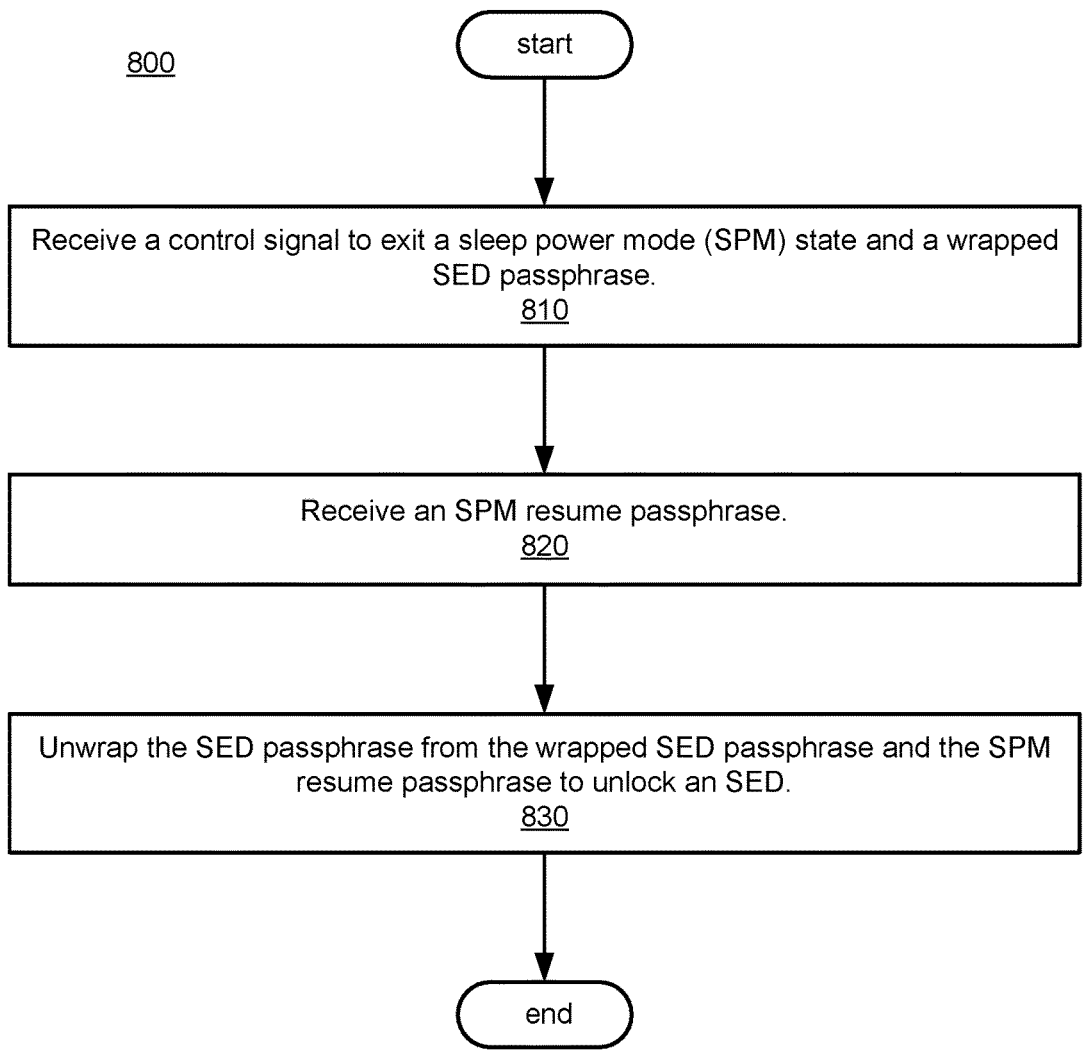
FIG. 8 illustrates a second example logic flow.

FIGS. 7-8 depict example logic flows that may be implemented by embodiments of the present disclosure. In particular, FIG. 7 depicts a logic flow 700 that may be implemented to initialize a SPM state recovery while FIG. 8 depicts a logic flow 800 that may be implemented to resume from an SPM state. In some examples, some or all of the devices 100, 200, and/or 300 may implement the logic flows. For example, the logic flows may be implemented by the TEE 140 and/or the SED 110. In particular, the circuitry 112 and 142, in executing the control routines 112 and 142, respectively, may implement the logic flows.

Turning more specifically to FIG. 7, the logic flow 700 may begin at block 710. At block 710 "receive an SED passphrase to unlock an SED," the TEE 140 may receive the SED passphrase 176. Continuing to block 720 "wrap the SED passphrase with an SPM resume passphrase," the TEE 140 may wrap the SED passphrase 176, for example, with the SPM passphrase 182 to from the wrapped SED passphrase 134. For example, the TEE 140 may generate the SPM resume passphrase 182 and apply a key wrapping technique to wrap the SED passphrase 176 with the SPM resume passphrase 182.

Continuing to block 730 "store the SPM resume passphrase to a standby power register, the standby power register to receive power during an SPM state," the TEE 140 may store the SPM resume passphrase 182 to a standby power register that is to receive power during the SPM state. For example, the TEE 140 may store the SPM resume passphrase 182 to the standby power register 180.

Turning more specifically to FIG. 8, the logic flow 800 may begin at block 810. At block 810 "receive a control signal to exit an SPM state and a wrapped SED passphrase" the TEE 140 may receive an indication (e.g., from the host control routine 132, or the like) to exit an SPM state. The TEE 140 may additionally, receive the wrapped SED passphrase 134.

Continuing to block 820 "receive an SPM resume passphrase" the TEE 140 may receive the SPM resume passphrase 182. For example, the TEE 140 may access the SPM resume passphrase 182 from the standby power register 180. Continuing to block 830 "unwrap the SED passphrase from the wrapped SED passphrase and the SPM resume passphrase to unlock an SED" the TEE 140 may unwrap the wrapped SED passphrase 134 based on the SPM resume passphrase 182. For example, the TEE 140 may apply a key wrap technique to recover the SED passphrase 176 from the wrapped SED passphrase 134 and the SPM resume passphrase 182.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 500. In some examples, the storage medium 2000 may store various types of computer executable instructions to implement technique 600. In some examples, the storage medium 2000 may store various types of computer executable instructions to implement logic flow 700. In some examples, the storage medium 2000 may store various types of computer executable instructions to implement logic flow 800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
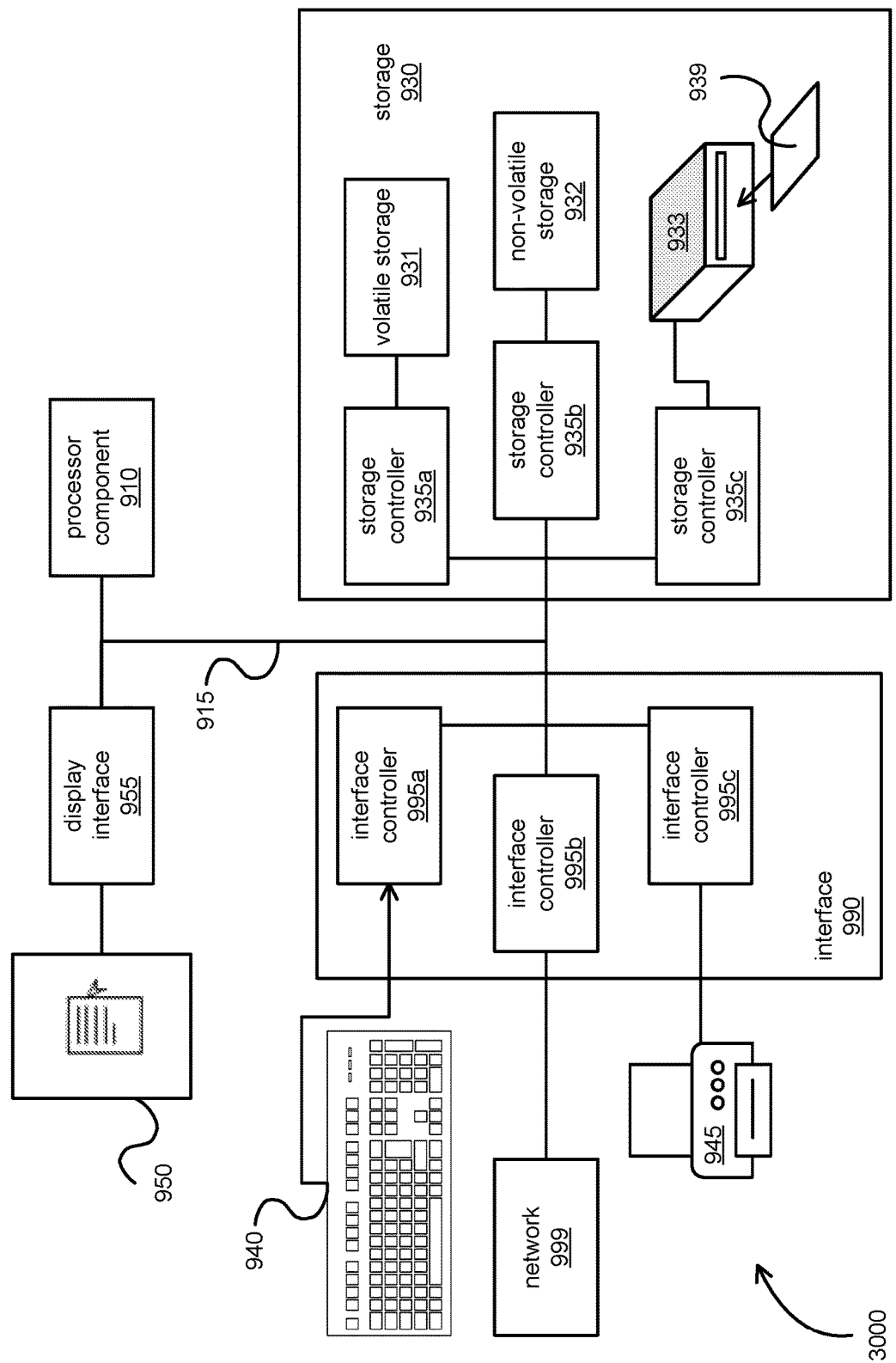
FIG. 10 illustrates an example system.

FIG. 10 illustrates an embodiment of an exemplary processing architecture 3000 suitable for implementing various embodiments as previously described. More specifically, the processing architecture 3000 (or variants thereof) may be implemented as part of the device 100, 200, and/or 300 of FIGS. 1-3.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, Serial ATA (SATA) and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic, phase change, or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to providing examples.

Example 1

An apparatus, comprising: a standby power register, the standby power register to receive power during a sleep power mode (SPM) state of the apparatus; logic, a portion of which is implemented in hardware, the logic to comprise: an SPM resume interface to: receive a self-encrypting drive (SED) passphrase to unlock an SED; wrap the SED passphrase with an SPM resume passphrase; and store the SPM resume passphrase to the standby power register.

Example 2

The apparatus of example 1, comprising a computer-readable storage, the SPM resume interface to store the wrapped SED passphrase to the computer-readable storage.

Example 3

The apparatus of example 2, the SPM resume interface to: receive an indication that the apparatus has exited the SPM state; receive the wrapped SED passphrase from the computer-readable storage; receive the SPM resume passphrase from the standby power register; and unwrap the SED passphrase based on the SPM resume passphrase.

Example 4

The apparatus of example 3, the SPM resume interface to provide the SED passphrase to the SED to unlock the SED upon exiting the SPM.

Example 5

The apparatus of example 1, the SPM resume interface to generate the SPM resume passphrase.

Example 6

The apparatus of example 1, the logic to comprise an SPM resume passphrase generator to generate the SPM resume passphrase.

Example 7

The apparatus of example 6, wherein the SPM resume passphrase generator comprises a random number generator, the SPM resume passphrase generator to generate the SPM resume passphrase based on the random number generator.

Example 8

The apparatus of example 1, the standby power register comprising a volatile memory register, the volatile memory register operably coupled to a first power rail, the first power rail to receive current during the SPM.

Example 9

The apparatus of example 8, comprising the SED, the SED operably coupled to a second power rail, the second power rail to be powered off during the SPM.

Example 10

The apparatus of example 1, the standby power register and the SPM resume interface to execute in a trusted execution environment.

Example 11

The apparatus of example 1, wherein the apparatus is the SED.

Example 12

A system comprising: a processing component; a standby power register, the standby power register to receive power during a sleep power mode (SPM) state of the system; a trusted execution environment (TEE); an SPM resume interface for execution by the TEE, the SPM resume interface to: receive a self-encrypting drive (SED) passphrase to unlock an SED; wrap the SED passphrase with an SPM resume passphrase; and store the SPM resume passphrase to the standby power register.

Example 13

The system of example 12, comprising the SED.

Example 14

The system of example 12, comprising a computer-readable storage, the SPM resume interface to store the wrapped SED passphrase to the computer-readable storage.

Example 15

The system of example 14, the SPM resume interface to: receive an indication that the system has exited the SPM state; receive the wrapped SED passphrase from the computer-readable storage; receive the SPM resume passphrase from the standby power register; and unwrap the SED passphrase based on the SPM resume passphrase.

Example 16

The system of example 15, the SPM resume interface to provide the SED passphrase to the SED to unlock the SED upon exiting the SPM.

Example 17

The system of example 12, the SPM resume interface to generate the SPM resume passphrase.

Example 18

The system of example 12, comprising an SPM resume passphrase generator to generate the SPM resume passphrase.

Example 19

The system of example 18, wherein the SPM resume passphrase generator comprises a random number generator, the SPM resume passphrase generator to generate the SPM resume passphrase based on the random number generator.

Example 20

The system of example 12, the standby power register comprising a volatile memory register, the volatile memory register operably coupled to a first power rail, the first power rail to receive current during the SPM.

Example 21

The system of example 20, comprising the SED, the SED operably coupled to a second power rail, the second power rail to be powered off during the SPM.

Example 22

An apparatus, comprising: a standby power register, the standby power register to receive power during a sleep power mode (SPM) state of the apparatus; a trusted execution environment (TEE); and an SPM resume interface for execution by the TEE, the SPM resume interface to: receive a self-encrypting drive (SED) passphrase to unlock an SED; wrap the SED passphrase with an SPM resume passphrase; and store the SPM resume passphrase to the standby power register.

Example 23

The apparatus of example 22, comprising a computer-readable storage, the SPM resume interface to store the wrapped SED passphrase to the computer-readable storage.

Example 24

The apparatus of example 23, the SPM resume interface to: receive an indication that the apparatus has exited the SPM state; receive the wrapped SED passphrase from the computer-readable storage; receive the SPM resume passphrase from the standby power register; and unwrap the SED passphrase based on the SPM resume passphrase.

Example 25

The apparatus of example 24, the SPM resume interface to provide the SED passphrase to the SED to unlock the SED upon exiting the SPM.

Example 26

The apparatus of example 22, the SPM resume interface to generate the SPM resume passphrase.

Example 27

The apparatus of example 22, comprising an SPM resume passphrase generator for execution by the TEE, the SPM resume passphrase generator to generate the SPM resume passphrase.

Example 28

The apparatus of example 27, wherein the SPM resume passphrase generator comprises a random number generator, the SPM resume passphrase generator to generate the SPM resume passphrase based on the random number generator.

Example 29

The apparatus of example 22, the standby power register comprising a volatile memory register, the volatile memory register operably coupled to a first power rail, the first power rail to receive current during the SPM.

Example 30

At least one machine-readable storage medium comprising instructions that when executed by a trusted execution environment (TEE) of a device, cause the TEE to: receive a self-encrypting drive (SED) passphrase to unlock an SED; wrap the SED passphrase with an SPM resume passphrase; and store the SPM resume passphrase to a standby power register, the standby power register to receive power during a sleep power mode (SPM) state of the device.

Example 31

The at least one machine-readable storage medium of example 30, comprising instructions that cause the TEE to store the wrapped SED passphrase to a computer-readable storage.

Example 32

The at least one machine-readable storage medium of example 31, comprising instructions that cause the TEE to: receive an indication that an apparatus has exited the SPM state; receive the wrapped SED passphrase from the computer-readable storage; receive the SPM resume passphrase from the standby power register; and unwrap the SED passphrase based on the SPM resume passphrase.

Example 33

The at least one machine-readable storage medium of example 32, comprising instructions that cause the TEE to provide the SED passphrase to the SED to unlock the SED upon exiting the SPM.

Example 34

The at least one machine-readable storage medium of example 30, comprising instructions that cause the TEE to generate the SPM resume passphrase.

Example 35

The at least one machine-readable storage medium of example 30, comprising instructions that cause the TEE to: generate a random number; and generate the SPM resume passphrase based on the random number.

Example 36

A computer-implemented method comprising: receiving a self-encrypting drive (SED) passphrase to unlock an SED; wrapping the SED passphrase with an SPM resume passphrase; and storing the SPM resume passphrase to a standby power register, the standby power register to receive power during a sleep power mode (SPM) state.

Example 37

The computer-implemented method of example 36, comprising storing the wrapped SED passphrase to a computer-readable storage.

Example 38

The computer-implemented method of example 37, comprising: receiving an indication that an apparatus has exited the SPM state; receiving the wrapped SED passphrase from the computer-readable storage; receiving the SPM resume passphrase from the standby power register; and unwrapping the SED passphrase based on the SPM resume passphrase.

Example 39

The computer-implemented method of example 38, comprising providing the SED passphrase to the SED to unlock the SED upon exiting the SPM state.

Example 40

The computer-implemented method of example 36, comprising generating the SPM resume passphrase.

Example 41

The computer-implemented method of example 36, comprising: generating a random number; and generating the SPM resume passphrase based on the random number.

Example 42

An apparatus for a device, the apparatus comprising means for performing the method of any one of examples 36 to 41.

The invention claimed is:

1. An apparatus, comprising:
a standby power register within a trusted execution environment (TEE), the standby power register to receive power during a sleep power mode (SPM) state of a processor element external to the TEE;
a computer-readable storage comprising a persistent key storage memory; and
logic for an SPM resume interface, a portion of which is implemented in hardware included in the TEE, the logic to:
receive a self-encrypting drive (SED) passphrase to unlock an SED;
wrap the SED passphrase with an SPM resume passphrase;
store the wrapped SED passphrase to the computer-readable storage;
store the SPM resume passphrase to the standby power register;
receive an indication that the apparatus has exited the SPM state;
receive the wrapped SED passphrase from the computer-readable storage;
receive the SPM resume passphrase from the standby power register; and
unwrap the SED passphrase with the SPM resume passphrase based on the indication that the apparatus has exited the SPM state.

2. The apparatus of claim 1, the logic for the SPM resume interface to provide the SED passphrase to the SED to unlock the SED upon exiting the SPM.

3. The apparatus of claim 1, the logic for the SPM resume interface to generate the SPM resume passphrase.

4. The apparatus of claim 1, the logic to comprise an SPM resume passphrase generator to generate the SPM resume passphrase.

5. The apparatus of claim 4, wherein the SPM resume passphrase generator comprises a random number generator, the SPM resume passphrase generator to generate the SPM resume passphrase based on the random number generator.

6. The apparatus of claim 1, the standby power register comprising a volatile memory register, the volatile memory register operably coupled to a first power rail, the first power rail to receive current during the SPM.

7. The apparatus of claim 6, comprising the SED, the SED operably coupled to a second power rail, the second power rail to be powered off during the SPM.

8. The apparatus of claim 1, the standby power register and the logic for the SPM resume interface to execute in a trusted execution environment.

9. The apparatus of claim 1, wherein the apparatus is the SED.

10. A system comprising:
a processing component included in hardware external to a trusted execution environment (TEE);
a standby power register within the TEE, the standby power register to receive power during a sleep power mode (SPM) state of the processing component;
a computer-readable storage; and
an SPM resume interface for execution by the TEE, the SPM resume interface to:
receive a self-encrypting drive (SED) passphrase to unlock an SED;
wrap the SED passphrase with an SPM resume passphrase;
store the wrapped SED passphrase to the computer-readable storage;

store the SPM resume passphrase to the standby power register;

receive an indication that the system has exited the SPM state;

receive the wrapped SED passphrase from the computer-readable storage;

receive the SPM resume passphrase from the standby power register; and unwrap the SED passphrase with the SPM resume passphrase based on the indication that the system has exited the SPM state.

11. The system of claim 10, comprising the SED.

12. The system of claim 10, the SPM resume interface to provide the SED passphrase to the SED to unlock the SED upon exiting the SPM.

13. The system of claim 10, the SPM resume interface to generate the SPM resume passphrase.

14. The system of claim 10, comprising an SPM resume passphrase generator to generate the SPM resume passphrase.

15. The system of claim 14, wherein the SPM resume passphrase generator comprises a random number generator, the SPM resume passphrase generator to generate the SPM resume passphrase based on the random number generator.

16. The system of claim 10, the standby power register comprising a volatile memory register, the volatile memory register operably coupled to a first power rail, the first power rail to receive current during the SPM.

17. The system of claim 16, comprising the SED, the SED operably coupled to a second power rail, the second power rail to be powered off during the SPM.

18. At least one non-transitory machine-readable storage medium comprising instructions that when executed by a trusted execution environment (TEE) of a device, cause the TEE to:

receive a self-encrypting drive (SED) passphrase to unlock an SED;

wrap the SED passphrase with a sleep power mode (SPM) resume passphrase;

store the wrapped SED passphrase to a computer-readable storage;

store the SPM resume passphrase to a standby power register within the TEE, the standby power register to receive power during a sleep power mode (SPM) state of a processor element external to the TEE;

receive an indication that the device has exited the SPM state;

receive the wrapped SED passphrase from the computer-readable storage;

receive the SPM resume passphrase from the standby power register; and unwrap the SED passphrase with the SPM resume passphrase based on the indication that the device has exited the SPM state.

19. The at least one non-transitory machine-readable storage medium of claim 18, comprising instructions that cause the TEE to provide the SED passphrase to the SED to unlock the SED upon exiting the SPM.

* * * * *